Figure 1:
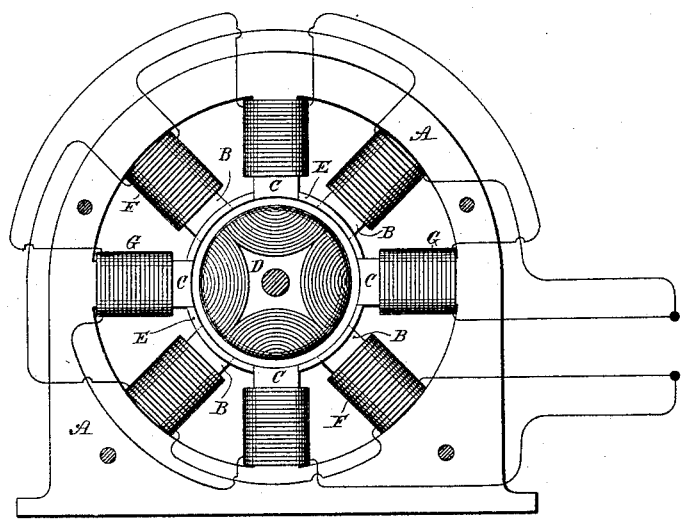

(No Model.)

N. TESLA.
ALTERNATING CURRENT MOTOR.

No. 433,701. Patented Aug. 5, 1890.

Witnesses:
Raphael Netter
Ernest Hopkinson

Inventor
Nikola Tesla
by
Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

ALTERNATING-CURRENT MOTOR.

SPECIFICATION forming part of Letters Patent No. 433,701, dated August 5, 1890.

Application filed March 26, 1890. Serial No. 345,389. (No model.)

*To all whom it may concern:*

Be it known that I, NIKOLA TESLA, a subject of the Emperor of Austria-Hungary, from Smiljan, Lika, border country of Austria-Hungary, residing at New York, in the county and State of New York, have invented certain new and useful Improvements in Alternating-Current Motors, of which the following is a specification, reference being had to the drawings accompanying and forming a part of the same.

This invention relates to that class of alternating-current motors in which the field-magnets are energized by coils connected up in two circuits derived from the same source and having different degrees of self-induction, whereby the currents in one circuit or branch are retarded more than in the other, with the result of producing a progressive advance or rotation of the points of maximum magnetic effect in the field that maintains the armature in rotation. In motors of this kind I have employed, among other means, a self-induction coil in one circuit and a dead-resistance in the other, or I have secured the same result by the special character of the winding of the two circuits, and in still another instance I have so constructed the motor that the retarded-current coils were nearly inclosed by iron, whereby the self-induction of such coils was very greatly increased.

The invention subject of this application is an improvement on this last-named plan.

In carrying out the invention I construct a field-magnet having two sets of poles or inwardly-projecting cores and placed side by side, so as practically to form two fields of force and alternately disposed—that is to say, with the poles of one set or field opposite the spaces between the other. I then connect the free ends of one set of poles by means of laminated-iron bands or bridge-pieces of considerably smaller cross-section than the cores themselves, whereby the cores will all form parts of complete magnetic circuits. When the coils on each set of magnets are connected in multiple circuits or branches from a source of alternating currents, electro-motive forces are set up in or impressed upon each circuit simultaneously; but the coils on the magnetically bridged or shunted cores will have, by reason of the closed magnetic circuits, a high self-induction, which retards the current, permitting at the beginning of each impulse but little current to pass. On the other hand, no such opposition being encountered in the other set of coils, the current passes freely through them, magnetizing the poles on which they are wound. As soon, however, as the laminated bridges become saturated and incapable of carrying all the lines of force, which the rising electro-motive force, and consequently increased current, produce, free poles are developed at the ends of the cores, which, acting in conjunction with the others, produce rotation of the armature.

The construction in detail by which this invention is illustrated is shown in the accompanying drawings.

Figure 2:
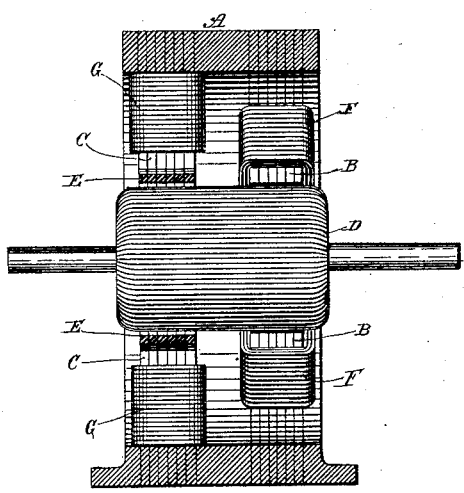

Figure 1 is a view in side elevation of a motor embodying the invention. Fig. 2 is a vertical cross-section of the same.

A is the frame of the motor, which is preferably built up of sheets of iron punched out to the desired shape and bolted together with insulation of a proper character between the sheets. When complete, the frame makes a field-magnet with inwardly-projecting pole-pieces B and C. To adapt them to the requirements of this particular case these pole-pieces are out of line with one another, those marked B surrounding one end of the armature and the others, as C, the opposite end, and they are disposed alternately—that is to say, the pole-pieces of one set occur in line with the spaces between those of the other sets.

The armature D is of cylindrical form, and is also laminated in the usual way and is wound longitudinally with coils closed upon themselves. The pole-pieces C are connected or shunted by bridge-pieces E. These may be made independently and attached to the pole-pieces, or they may be parts of the forms or blanks stamped or punched out of sheet-iron. Their size or mass is determined by various conditions, such as the strength of the current to be employed, the mass or size of the cores to which they are appplied, and other well-understood conditions.

Coils F surround the pole-pieces B, and other coils G are wound on the pole-pieces C.

These coils are connected in series in two circuits, which are braches of a circuit from a generator of alternating currents, and they may be so wound, or the respective circuits in which they are included may be so arranged, that the circuit of coils G will have independently of the particular construction herein described a higher self-induction than the other circuit or branch.

The function of the shunts or bridges E is that they shall form with the cores C a closed magnetic circuit for a current up to a predetermined strength, so that when saturated by such current and unable to carry more lines of force than such a current produces they will to no further appreciable extent interfere with the development by a stronger current of free magnetic poles at the ends of the cores C.

In such a motor the current is so retarded in the coils G and the manifestation of the free magnetism in the poles C is delayed beyond the period of maximum magnetic effect in poles B that a strong torque is produced and the motor operates with approximately the power developed in a motor of this kind energized by independently-generated currents differing by a full-quarter phase.

What I claim in this application is—

1. In an alternating-current motor having two sets or series of pole-pieces, the combination, with one of such sets or series, of magnetic shunts or bridges connecting their free ends, as herein set forth.

2. In an alternating-current motor having two sets or series of pole-pieces energized by coils in independent circuits from the same source, the combination, with one of the sets or series of pole-pieces, of magnetic shunts or bridges connecting their free ends, as described.

3. In an alternating-current motor having a laminated or subdivided field-magnet provided with two sets or series of cores or pole-pieces, the combination, with such pole-pieces, of energizing-coils connected, respectively, in two circuits derived from the same source of alternating currents and laminated or subdivided iron shunts or bridges of smaller cross-section than the pole-pieces and joining the free ends of all the cores or pole-pieces of one set to form closed magnetic circuits, as set forth.

4. In an alternating-current motor, the combination, with a set or series of field-poles and energizing-coils wound thereon, of an intermediate set of pole-pieces forming portions of closed magnetic circuits and coils thereon in a circuit derived from the same source of alternating currents as the other, as set forth.

NIKOLA TESLA.

Witnesses:
ROBT. F. GAYLORD,
PARKER W. PAGE.